(12) United States Patent
Friedman et al.

(10) Patent No.: US 10,479,051 B2
(45) Date of Patent: *Nov. 19, 2019

(54) DECORATIVE PANEL

(71) Applicants: Harold S Friedman, New York, NY (US); Jeffrey M Friedman, New York, NY (US); Viktor Tsvik, Brooklyn, NY (US)

(72) Inventors: Harold S Friedman, New York, NY (US); Jeffrey M Friedman, New York, NY (US); Viktor Tsvik, Brooklyn, NY (US)

(*) Notice: Subject to any disclaimer, the term of this patent is extended or adjusted under 35 U.S.C. 154(b) by 334 days.

This patent is subject to a terminal disclaimer.

(21) Appl. No.: 15/278,844

(22) Filed: Sep. 28, 2016

(65) Prior Publication Data

US 2017/0015086 A1 Jan. 19, 2017

Related U.S. Application Data

(63) Continuation of application No. 14/664,546, filed on Mar. 20, 2015, now Pat. No. 9,469,567.

(51) Int. Cl.
*B32B 15/04* (2006.01)
*B32B 17/06* (2006.01)
(Continued)

(52) U.S. Cl.
CPC .............. *B32B 17/062* (2013.01); *B32B 3/12* (2013.01); *B32B 5/02* (2013.01); *B32B 7/12* (2013.01);
(Continued)

(58) Field of Classification Search
USPC .................................................. 426/426, 688
See application file for complete search history.

(56) References Cited

U.S. PATENT DOCUMENTS 4,594,281 A 6/1986 Haraga et al.
5,598,674 A * 2/1997 Lay .......................... B32B 15/08
52/309.1
(Continued)

*Primary Examiner* — Lauren R Colgan
(74) *Attorney, Agent, or Firm* — Holtz, Holtz & Volek PC

(57) ABSTRACT

A building panel, which includes a decorative assembly including a glass assembly which includes first and second layers of glass and a clear interlayer between said first and second layers of glass, said glass assembly being compliant with safety code ANSI Z97.1, said glass assembly having opposed first and second surfaces, said first surface of said glass assembly being defined by said first layer of glass and being an outermost surface of said glass assembly, and said second surface of said glass assembly being defined by said second layer of glass; and a decorative sheet having opposed first and second surfaces, said first surface of said decorative sheet being in contact with said second surface of said glass assembly, said decorative sheet being directly attached to said second surface of said glass assembly without an adhesive between said decorative sheet and said second layer of glass; and a protective backing sheet having opposed front and rear surfaces, said front surface being in contact with said second surface of said decorative sheet, and said second surface of said backing sheet being on an opposite side of said backing sheet from a side on which said glass assembly is situated.

21 Claims, 1 Drawing Sheet

(51) Int. Cl.
    *C03C 21/00*     (2006.01)
    *B32B 15/10*     (2006.01)
    *B32B 21/08*     (2006.01)
    *B32B 3/12*     (2006.01)
    *B32B 7/12*     (2006.01)
    *B32B 15/20*     (2006.01)
    *B32B 21/02*     (2006.01)
    *B32B 37/14*     (2006.01)
    *B32B 5/02*     (2006.01)
    *B32B 9/04*     (2006.01)
    *B32B 15/08*     (2006.01)
    *B32B 15/12*     (2006.01)
    *B32B 15/14*     (2006.01)
    *B32B 21/14*     (2006.01)
    *B32B 27/06*     (2006.01)
    *B32B 27/10*     (2006.01)
    *B32B 27/12*     (2006.01)
    *B32B 29/00*     (2006.01)
    *B32B 37/12*     (2006.01)

(52) U.S. Cl.
    CPC .............. *B32B 9/042* (2013.01); *B32B 15/04* (2013.01); *B32B 15/043* (2013.01); *B32B 15/08* (2013.01); *B32B 15/10* (2013.01); *B32B 15/12* (2013.01); *B32B 15/14* (2013.01); *B32B 15/20* (2013.01); *B32B 21/02* (2013.01); *B32B 21/08* (2013.01); *B32B 21/14* (2013.01); *B32B 27/06* (2013.01); *B32B 27/10* (2013.01); *B32B 27/12* (2013.01); *B32B 29/002* (2013.01); *B32B 37/14* (2013.01); *C03C 21/002* (2013.01); *B32B 37/12* (2013.01); *B32B 2307/558* (2013.01); *B32B 2307/584* (2013.01); *B32B 2307/714* (2013.01); *B32B 2307/732* (2013.01); *B32B 2419/00* (2013.01); *B32B 2451/00* (2013.01); *B32B 2607/00* (2013.01)

(56) References Cited

U.S. PATENT DOCUMENTS

| | | |
|---|---|---|
| 6,564,908 B2 | 5/2003 | Sanchez et al. |
| 2008/0307729 A1* | 12/2008 | Maimon .................. E04C 2/292 |
| | | 52/332 |
| 2015/0086048 A1* | 3/2015 | Brown ...................... H04R 1/02 |
| | | 381/152 |

* cited by examiner

DECORATIVE PANEL

CROSS-REFERENCE TO RELATED APPLICATIONS

This is a Continuation of U.S. Ser. No. 14/664,546, filed Mar. 20, 2015, the entire contents of which are incorporated herein by reference.

FIELD OF INVENTION

The present invention relates generally to a panel for an interior surface of a building, and specifically an interior wall of an elevator, and more specifically to a panel that is attached to a wall or other substrate and provides a decorative appearance.

BACKGROUND OF THE INVENTION

Panels are commonly used in buildings to cover or form walls. In elevators, panels are often used to cover or form the walls and have added requirements or desires. For example, the panels in an elevator are sought to be scratch-resistant or scratch-proof.

More importantly, the panels in an elevator must satisfy a safety code, designated Z97, that requires them to have minimum strength and shatter-resistant conditions, among others. As stated in some code manuals, glass in elevator enclosures shall be laminated glass conforming to ANSI Z97.1. Markings as specified in the applicable standard shall be on each separate piece of glass and shall remain visible after installation.

In the prior art, U.S. Pat. No. 4,594,281 (Haraga et al.) describes a panel used as a material for forming a wall of a general building material such as an elevator. The panel includes a rigid front plate and a rigid back plate having a corrugated cross-section adhered to a rear side of the front plate by a reinforcing bonding agent made of a synthetic resin material.

Also, U.S. Pat. No. 6,564,908 (Sanchez et al.) describes a wall panel assembly for use as an interior wall of an elevator car. The wall panel assembly includes a wall panel embossed to form a central portion, a decorative panel having an ornamental front surface, and an adhesive material that attaches the decorative panel to the wall panel. When the wall panel is installed in an elevator car, the decorative panel ornamental front surface is visible to passengers. The decorative panel can be formed of a flexible laminate material to follow the contour of the central portion.

OBJECTS AND SUMMARY OF THE INVENTION

An object of the present invention is to provide a decorative panel for use in elevator cars that satisfies code ANSI Z97.1.

A building panel, in particular for use in an elevator car, in accordance with the invention includes a glass assembly having at least first and second layers of glass and a layer of clear film therebetween, and which is compliant with safety code ANSI Z97.1, a decorative sheet arranged alongside the first layer of glass, and a backing sheet arranged alongside said decorative sheet on an opposite side from the glass assembly. A support structure is arranged alongside the backing sheet on an opposite side from the decorative sheet.

Numerous compositions of the decorative sheet, backing layer and support structure are envisioned, including making the decorative sheet from wood, the backing sheet from metal or plastic, and the support structure from aluminum, metal honeycomb, medium density fibreboard or plastic.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
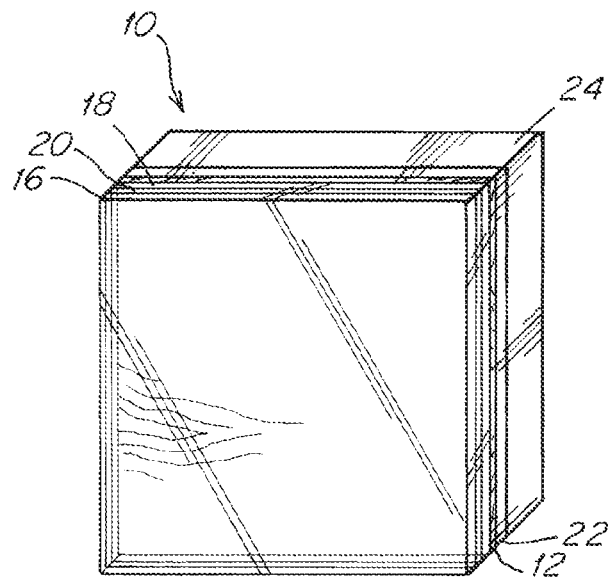
FIG. 1 is a perspective view of a panel in accordance with the invention.

Referring to the accompanying drawings, FIG. 1 is a perspective view of a panel 10 in accordance with the invention seen from the side that will be visible when the panel 10 is mounted to a wall or other substrate. FIG. 1 shows various layers of panel 10 enlarged for clarity and ease of description. Generally, the panel 10 is designed for installation in an elevator, but it may be used in other structures. For elevators, the panel 10 provides specific, elevator-specific advantages, discussed below.

As seen in FIG. 1, the panel 10 presents a wood veneer provided by a thin decorative sheet 12 of wood. Decorative Sheet 12 may be, instead of wood, made of bronze, rice paper, fabric or any other material that provides a decorative appeal to the panel 10 known to those skilled in the art of decorative wall panels. In one embodiment, the decorative sheet 12 has a thickness of about $1/32$ to about $1/64$ inch (from about 0.4 mm to about 0.8 mm).

Figure 2:
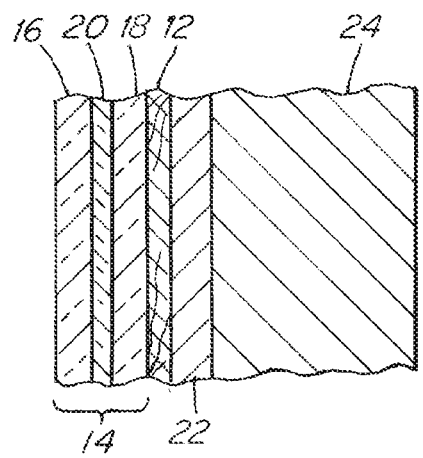
FIG. 2 is a cross-sectional view of the panel shown in FIG. 1.

Sheet 12 is visible through a glass assembly 14 including a first, exterior sheet of glass 16, a second, interior sheet of glass 18 and a layer of clear film 20 between the first and second glass sheets 16, 18, as seen in FIG. 2. Film 20 may be considered an interlayer as this term is known and used by those skilled in the art, and may be made from materials other than film.

The first and second glass sheets 16, 18 have a thickness of about 1.5 mm and may be CORNING® GORILLA® glass, a known type of glass in the decorative wall panel industry. CORNING® GORILLA® glass is a type of alkali-aluminosilicate sheet glass that is used primarily as cover glass for portable electronic devices, including mobile phones, portable media players, portable computer displays, and some television screens. The glass gains its surface strength, ability to contain flaws, and crack-resistance by being immersed in a hot potassium salt ion-exchange bath. Other comparable glass may be used in the invention without deviating from the scope and spirit thereof.

Moreover, the glass assembly 14 may be an existing laminate that can currently be bought from, for example, Corning, Inc. The interlayer 20 that is used to bond two layers of thin glass together may also be a commercial product currently sold by Corning. It is to be understood that although the glass assembly is shown as consisting of two layers of glass and a film therebetween, other glass assemblies may be used in accordance with the invention.

The glass assembly 14 may be attached to the decorative sheet 12 using an autoclaving process, the parameters of which would be readily determinable by those skilled in the art to which this invention pertains. The selected autoclave process should not interfere with the visualization of the decorative sheet 12 through the glass assembly 14.

On the opposite side of the decorative sheet 12, a metal backing sheet 22 is attached using an autoclaving process, the parameters and operating conditions of which would be readily determinable by those skilled in the art to which this invention pertains. These parameters and operating conditions include, for example, the temperature range, the pressure range, the selection of polymeric adherence materials. This attachment may be achieved using the same autoclaving process as the decorative sheet 12 is attached to the glass assembly 14, or using a different autoclaving process. Adhesive and glue are not usually required in the autoclaving process. Rather, a polymeric material is used in the autoclaving process to cause the adherence of the decorative sheet 12 to the glass assembly and the adherence of the backing sheet 22 to the decorative sheet 12.

The backing sheet 22 may have a thickness of about 1.5 mm. Backing sheet 22 may be made of a metal such as aluminum. Alternatively, backing sheet 22 may be made of plastic. Metal is a preferred material for the backing sheet because it protects the decorative sheet 12, when made of wood, from corrosion, color change and other degrading effects. Backing sheet 22 may also be provided with water-resistant capabilities and/or chemical-resistant capabilities through appropriate design and selection of its materials.

The glass assembly 14 with the decorative sheet 12 and backing sheet 22 bonded/autoclaved thereto form a permanent composite structure or panel. This structure is usable in a variety of ways, which would be readily known to those skilled in the art in view of the disclosure herein. In one embodiment, however, this structure is modified to facilitate its attachment to a vertical substrate such as a wall of an elevator car, i.e., to form the panel 10.

As shown in FIG. 2, the panel 10 may be completed by attaching a support structure 24 to the rear of the backing sheet 22, for example, using an adhesive. The thickness of the support structure 24 is selected to provide the panel 10 with an overall thickness of about 0.75 inch, about 19.05 mm. The support structure 24 may be made of aluminum or another metal, medium density fibreboard (MDF) or plastic, and may have a honeycomb structure, e.g., metal honeycomb. Depending on the material of the backing sheet 22, different adhesive or attachment techniques may be used to ensure bonding of the backing sheet 22 to the support structure 24. A fire retardant support structure 24 may be used.

If desired, the support structure 24 may be provided with usual attachment structure to enable its attachment to a wall or other substrate. This attachment structure is known to those skilled in the art to which this invention pertains.

With the foregoing structure, a layered structure is provided that has five discrete component layers of material (six if the optional support structure 24 is included). The five basic components layers are the backing sheet 22, the decorative sheet 12 attached to the backing sheet 22, the interior sheet of glass 18 attached to the decorative sheet 12, the film 20 on the outer side of the interior sheet of glass 18, and the exterior sheet of glass 16 sandwiching the film 20 with the interior sheet of glass 18. In each five-layer decorative panel 10, the component layers are substantially coextensive with one another and may be manufactured in any dimensions sought by those in the construction industry. Any adhesive layers present in the panel 10 are used to bind the component layers together, but such adhesive is often not required in view of a possible use of an autoclaving process to bind or bond the components together.

This five-layer decorative structure (including glass sheets 16, 18, interlayer 20, decorative sheet 12 and backing sheet 22) has been found to provide significant advantages that suit its use as a decorative wall panel. These advantages include the fact that it provides a hardy structure that does not easily separate into its component parts, and it is light weight since the layers made of relatively heavy material are very thin (the bulk of the thickness is provided by a relatively light weight material such as aluminum, the optional sixth component, forming the support structure 24). Another advantage is that it provides a strong, protective structure that does not easily break when impacted on the side of the exterior sheet of glass 16.

The wall panel 10 also presents a high quality appearance in view of the visibility of the decorative sheet 12 through the clear glass assembly 14.

In an exemplifying use, a plurality of the panels 10 would be attached to a wall of an elevator car alongside one another and in side-to-side contact with one another (with the optional support structure 24 on each panel 10 if needed). The wall would thus appear with a decorative finish provided by the decorative sheet 12 in each panel 10.

Panel 10 solves a particular problem in the elevator industry in that when a decorative material, such as wood, is sought to be used in an elevator car wall panel, the decorative material was usually formed in a laminate between two sheets of relatively thick float glass. However, since each type of wood is inherently structurally and materially distinct, each batch of panels from a specific wood required testing to comply with safety code ANSI Z97.1. Details of the requirements of safety code ANSI Z97.1 are readily available to those in the construction industry.

It was not possible to assume compliance when a different type of wood was laminated between two glass sheets, but rather, safety code testing was required before use of the panels. Moreover, the sheets of glass (float glass) sandwiching the decorative material were often thick, and thus heavy.

The present invention eliminates any and all such issues because the glass assembly 14 itself is compliant with safety code ANSI Z97.1, and may be indicated or marked as such. Therefore, by incorporating the decorative sheet 12, backing layer 22 and support structure 24 in a panel 10 with safety code ANSI Z97.1-compliant glass assembly 14, the panel 10 in its entirety will be safety code ANSI Z97.1-compliant. Further testing is not necessary. As such, it becomes possible to use any variety of different decorative sheets 12 without requiring testing for compliance with safety code ANSI Z97.1. Once the outer glass assembly 14 is compliant, any panel including the outer glass assembly 14 may be considered compliant as well.

Moreover, since the thickness of glass assembly 14 is just slightly more than 3 mm, it is very light compared to thick layers of float glass previously used with decorative material therebetween.

The panel 10 may be manufactured in a method including attaching a safety code ANSI Z97.1-compliant glass assembly 14 and a decorative sheet 12 to one another, attaching a backing sheet 22 to the decorative sheet 12 on an opposite side from the glass assembly 14, and attaching a support structure 24 to the backing sheet 22 on an opposite side from the decorative sheet 12. The attachments involving the decorative sheet 12 may be performed using an autoclaving process, while the attachment of the support structure 24 and the backing sheet 22 may use an adhesive.

In one particular manufacturing method using rigid film, the panel 10 is produced by interleaving individual layers of the following components with thermoplastic adhesive film or sheet while being placed one on top of another. The first component is a thin laminated glass plate (glass assembly 14). The second component is one or more decorative layers or sheets 12 arranged in the desired order. The third component is a non-glass material, e.g., the backing sheet 22. The resulting layered structure is subjected to heat and pressure via autoclaving. Parameters of the autoclaving, e.g., temperature and pressure parameters, should be selected according the adhesive film manufacturer specifications and thus would depend partly on the thermoplastic adhesive film or sheet being used.

In another manufacturing method using curable liquid materials, individual layers of the above components are laminated (bonded) one on top of another utilizing liquid curable to a solid state starting with the glass plate component (glass assembly 14); then decorative component layer(s) in the desired order (decorative sheet(s) 12); and then the non-glass component (backing sheet 22). The resulting layered structure is allowed to cure. Parameters of the curing, e.g., using visible or UV light, or temperature and pressure parameters, should be selected according the curable liquid being used.

Finally, it is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention. It is to be understood that the present invention is not limited to the embodiments.

The invention claimed is:

1. A building panel, comprising:
    a decorative assembly comprising:
        a glass assembly consisting of first and second layers of glass and a clear interlayer between said first and second layers of glass, said glass assembly being compliant with safety code ANSI Z97.1, said glass assembly having opposed first and second surfaces, said first surface of said glass assembly being defined by said first layer of glass and being an outermost surface of said glass assembly, and said second surface of said glass assembly being defined by said second layer of glass; and
        a decorative sheet having opposed first and second surfaces, said first surface of said decorative sheet being in contact with said second surface of said glass assembly, said decorative sheet being directly attached to said second surface of said glass assembly without adhesive; and
    a protective backing sheet having opposed front and rear surfaces, said front surface being in contact with said second surface of said decorative sheet, and said rear surface of said backing sheet being on an opposite side of said backing sheet from a side on which said glass assembly is situated, said backing sheet and said decorative sheet being directly attached to one another without an adhesive.

2. The building panel of claim 1, wherein said decorative sheet consists of at least one material selected from a group consisting of wood, bronze, paper and fabric.

3. The building panel of claim 1, further comprising a support structure having a first surface in contact with said rear surface of said backing sheet and therefore being situated on an opposite side of said backing sheet from a side on which said decorative sheet is situated.

4. The building panel of claim 3, wherein said support structure has a honeycomb structure.

5. The building panel of claim 3, wherein said support structure is made of metal.

6. The building panel of claim 3, wherein said support structure is made of medium density fibreboard (MDF).

7. The building panel of claim 3, wherein said support structure has a thickness relative to the thickness of said glass assembly, said decorative sheet and said backing sheet to provide the building panel with a thickness of about 19 mm.

8. The building panel of claim 1, wherein said decorative sheet has a thickness of about 0.4 mm to about 0.8 mm.

9. The building panel of claim 1, wherein said backing sheet has a thickness of about 1.5 mm.

10. The building panel of claim 1, wherein said interlayer is made of clear film.

11. The building panel of claim 1, wherein said first and second layers of glass each comprise a sheet of glass that has been immersed in a hot potassium salt ion-exchange bath.

12. The building panel of claim 1, wherein said decorative sheet and said second layer of glass are directly attached to one another without adhesive by an autoclaving process.

13. The building panel of claim 1, wherein said protective backing sheet is a single layer metal backing sheet.

14. The building panel of claim 1, wherein the building panel consists of five discrete component layers which are in order, said first layer of glass, said interlayer, said second layer of glass, said decorative sheet, and said backing sheet, said five layers being coextensive with one another, the building panel lacking adhesive between said first layer of glass and said backing sheet.

15. The building panel of claim 1, wherein said decorative assembly consists of said first and second layers of glass, said interlayer and said decorative sheet to the exclusion of adhesive.

16. The building panel of claim 1, wherein said backing sheet is coextensive with said decorative sheet whereby said backing sheet extends alongside all of said decorative sheet and protects said decorative sheet.

17. A building panel, comprising:
    a decorative assembly comprising:
        a glass assembly of first and second layers of glass and a clear interlayer between said first and second layers of glass, said glass assembly being compliant with safety code ANSI Z97.1, said glass assembly having opposed first and second surfaces, said first surface of said glass assembly being defined by said first layer of glass and being an outermost surface of said glass assembly, and said second surface of said glass assembly being defined by said second layer of glass; and
        a decorative sheet having opposed first and second surfaces, said first surface of said decorative sheet being in contact with said second surface of said glass assembly, said decorative sheet consisting of at least one material selected from a group consisting of wood, bronze, paper and fabric; and
    a single layer metal backing sheet having opposed front and rear surfaces, said front surface being in contact with said second surface of said decorative sheet, and said rear surface of said backing sheet being on an opposite side of said backing sheet from a side on which said glass assembly is situated, said backing sheet and said decorative sheet being directly attached to one another without adhesive.

18. The building panel of claim 17, further comprising:
a support structure having a first surface in contact with said rear surface of said backing sheet and therefore being situated on an opposite side of said backing sheet from a side on which said decorative sheet is situated, said decorative sheet being directly attached to said second surface of said glass assembly without adhesive by an autoclaving process.

19. The building panel of claim 17, wherein said backing sheet and said decorative sheet are directly attached to one another without adhesive by an autoclaving process.

20. The building panel of claim 17, wherein the building panel consists of five discrete component layers which are in order, said first layer of glass, said interlayer, said second layer of glass, said decorative sheet, and said backing sheet, said five layers being coextensive with one another, the building panel lacking adhesive between said first layer of glass and said backing sheet.

21. The building panel of claim 17, wherein said backing sheet is coextensive with said decorative sheet whereby said backing sheet extends alongside all of said decorative sheet and protects said decorative sheet.

\* \* \* \* \*